United States Patent [19]

Otala et al.

[11] 4,221,260
[45] Sep. 9, 1980

[54] CONTROL AND MEASURING SYSTEM FOR FLAT-INDIVIDUAL HEATING/COOLING AND PROCEDURE FOR THE SYSTEM'S CALIBRATION

[75] Inventors: Matti N. T. Otala, Oulu; Lauri Kuokkanen, Oulunsalo, both of Finland

[73] Assignee: Insele OY, Kaukipudas, Finland

[21] Appl. No.: 937,420

[22] Filed: Aug. 28, 1978

[30] Foreign Application Priority Data

Sep. 1, 1977 [FI] Finland .................... 772591

[51] Int. Cl.³ ............ G05D 23/00; G01K 17/06
[52] U.S. Cl. .................... 165/11 R; 73/193 R; 236/94
[58] Field of Search ........ 165/11; 236/94; 62/127; 73/193 R, 193 A

[56] References Cited

U.S. PATENT DOCUMENTS

| | | | |
|---|---|---|---|
| 3,995,686 | 12/1976 | Laube | 165/11 |
| 4,049,044 | 9/1977 | Cohen | 165/11 |

FOREIGN PATENT DOCUMENTS

2626057 12/1976 Fed. Rep. of Germany ........ 73/193 R

Primary Examiner—Albert W. Davis
Assistant Examiner—Margaret A. Focarino
Attorney, Agent, or Firm—Shenier & O'Connor

[57] ABSTRACT

The present invention concerns a control and measuring system for flat-individual heating/cooling, meant to serve the purposes of charging for the total heating-/cooling energy consumption individually per flat, said system comprising as components known in themselves in prior art: room thermostats, which govern the valves of heating radiators or cooling evaporators, the thermostats and valves presenting an on/off design, and measuring pick-ups for the heating/cooling fluid temperature on the outgoing and return sides, and a connecting unit for transfer of the measurement data to a central unit, which is responsible for data processing and output.

Systems which would enable the heating or cooling energy consumed in each individual flat to be determined and charged have not been developed to a usable level up to date, because such a system has been considered disproportionately expensive in view of the savings of energy consumption that could be achieved and since it has even been thought impossible to work out a system which would render possible the equitable and accurate charging for each flat individually.

10 Claims, 5 Drawing Figures

Build-up of the system

Figure 1:
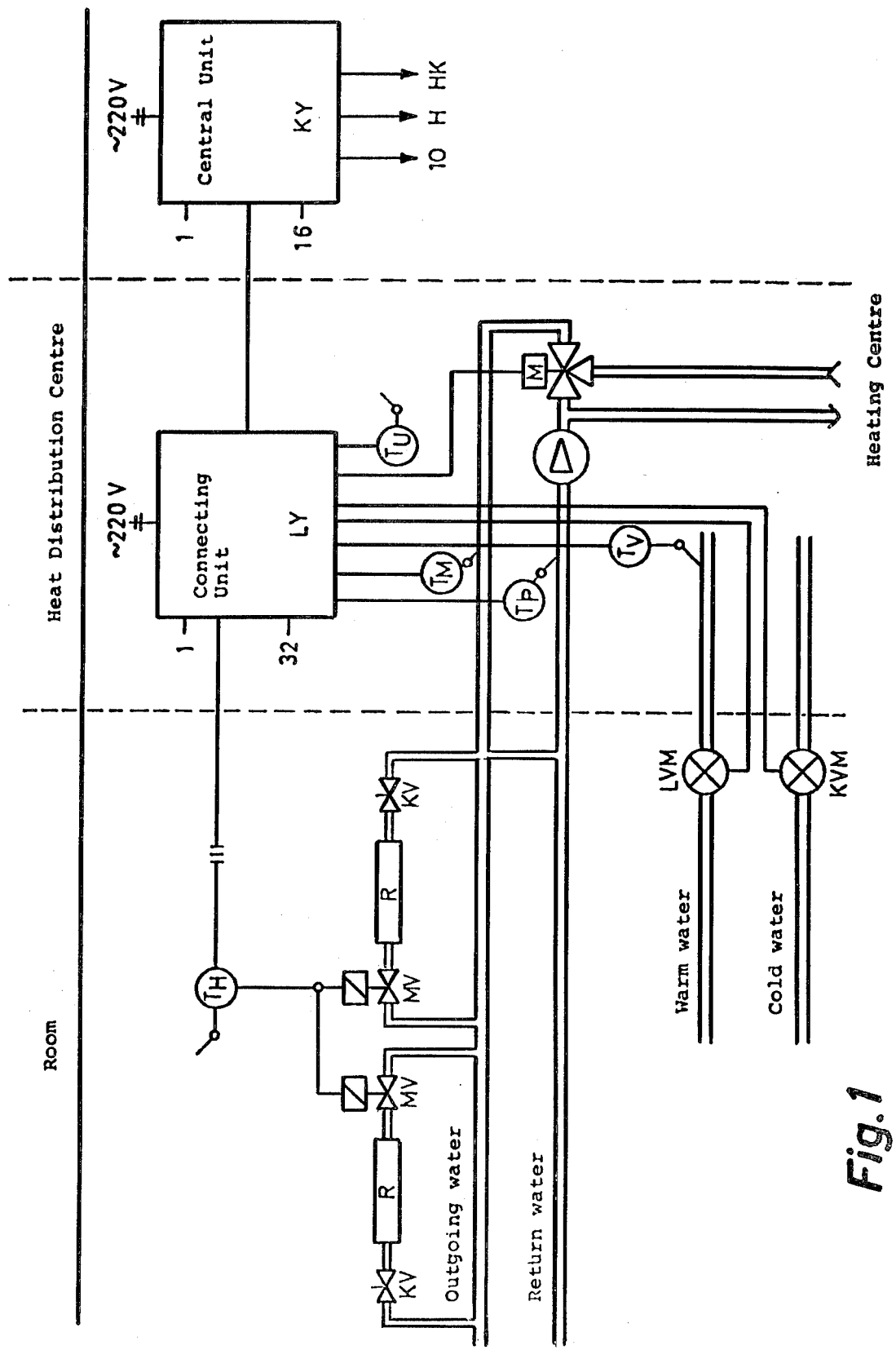

Fig. 1  Build-up of the system

Thermostat and magnetic valve

The central unit

The print-out format in the
weekly and monthly print-outs
is as follows:

```
1977-07-01
Month 6
Flat 31

Temperatures:
Room 1        20,2 C
Room 2        22,5 C
Room 3        19,5 C

Heating, total   1,25
Own              1,22
Fl. 30          - 0,11
Fl. 32          + 0,05
Fl.. 41         - 0,06
Fl. 21          + 0,15

Cold water       1322 l
Warm water        261 l 1977-07-01
Month 6
Flat 32
```

The print-out format in trouble
events is as follows:

```
1977-07-12
22.16

Flat 31

Room 1
Temperature      20,3 C
Valve             0,72

Room 2
Temperature      20,0 C
*** Valve         0,99

Room 3
*** Temperature  24,2 C
*** Valve         0,99
```

Fig. 4

Fig. 5

CONTROL AND MEASURING SYSTEM FOR FLAT-INDIVIDUAL HEATING/COOLING AND PROCEDURE FOR THE SYSTEM'S CALIBRATION

The object of the invention is to provide an economical system which enables equitable and accurate charging, per flat, of the consumption of heating and cooling energy and of the water consumption, and with the aid of which the resident may himself select the price level of his place of living as regards both heat and water consumption. When the resident knows that it is he who pays for his own consumed thermal energy, it is to be expected that by the aid of the system, compared with the present joint charging, savings amounting to 25–60% in the heating costs and water costs may be achieved.

The object of the invention is attained by means of a system of the initially mentioned type and composed of components known in themselves in prior art, in that the relative consumption of heating or cooling energy in the flats is measured by monitoring the proportion of the open/closed times of the valves belonging to the heating radiators or cooling evaporators and by employing the temperatures of the heating or cooling fluid on the return side as weighting factors. It is thus understood that no attempts whatsoever is made in the invention to measure, for instance, the absolute thermal energy given off by the radiators; it is enough of a foundation for determination of charges to know the proportion in which each individual flat draws, relatively, from the total thermal energy consumed in the building.

For the sake of simplicity, in the following the application of the invention to a heating system shall be considered, but it is clear that an equivalent measuring and control system may also be implemented in connection with central cooling systems, which are in use at the moment, to some extent, in hot climate countries. The fluid circulating in the pipes is then a cooling fluid and refrigerating machinery is used instead of a heating centre. The heating radiators are replaced with, for intance, louvre type refrigerating fluid evaporators, through which the cooling air is blown. In all other respects the flat-individual measurement and control of the energy quantity required for cooling take place as will be described hereinbelow, with reference to a heating system. Therefore, when in the following the term "outgoing water" is used, this is understood to mean the heating or cooling circulation fluid on any kind of outgoing side.

The measuring principle of the invention may at the same time also be used to assist the fault monitoring of the whole system, in that a central unit monitors the said time proportion and compares it, individually for each flat, with the temperature in the particular flat and actuates a fault alarm if the said quantities deviate from certain predetermined limiting values or if their ratio changes.

It is advantageous for optimizing the outgoing water temperature, if the temperature of the outgoing water has been arranged to be controllable in such manner that the open/closed+open time ratio of the valves in the whole building on the average equals a predetermined constant, most appropriately between 0.5 and 0.6. Similarly, the quantity of cooling fluid is controlled in a cooling system.

While in heating systems known in prior art the temperature of the outgoing water has usually been controlled on the basis of the out door temperature, in the system of the invention the outdoor temperature only constitutes the basis for determination of an upper limit for the outgoing water temperature, and control of the outgoing water temperature is accomplished in the above-said optimum manner. Similarly, in a cooling system, the outdoor temperature may be used as basis for determining an upper limit for the quantity of cooling fluid on the outgoing side.

The cooperation between the connecting unit, thermostat and valve has been so arranged, according to a favourable embodiment of the invention, that the thermostat operates as a series-connected switch between the connecting unit and the valve so that at the beginning of the control periods recurring at definite intervals the valves receive no loading, and that after lapse of a time which is proportional to the difference between the room temperature and the thermostat's setpoint temperature the thermostat will connect the loading to the valve, the closed/open times of the valves being monitored in the connecting unit by measuring the loading power that has gone to each thermostat.

The fundamental idea of the invention, that is, that one aims to measure the distribution within the building of the consumption of thermal energy (of energy needed for cooling), not the absolute amount of thermal energy (cooling energy) itself, may be utilized not only towards the performing of measurements in itself but also for calibration of the system so that the residents will be guaranteed the same basic temperature against the same basic playment in every room, regardless of variable factors such as the different location of flats, different thermal insulation and different heat leakage from the pipelines and ventilation ducts.

Thus, the invention also concerns a procedure for calibration of the said measuring and control system.

To begin with, a coarse adjustment of the system is carried out, which is exactly equivalent to the general practice followed in existing heating systems. In accordance herewith, as the heating system for a building is being planned, the basic setting of the throttling valve of each radiator is calculated from the fundamental data of the pipeline system, at the commissioning of the heating system the throttling valves are set as has been calculated, the thermostats are set to their highest temperature setting and the outgoing water temperature is so adjusted that in the rooms a certain average temperature is obtained, e.g., 20° C., the room-individual deviations being eliminated by correcting the calculated position of the throttling valves. But it is not possible to regulate the positions of the throttling valves which such high accuracy that this would ensure under equal conditions, equal closed/open proportions of all radiator valves.

Owing to this fact, a calibration of the system has to be carried out in accordance with the invention, so that thereafter all thermostats are secured in a given position, let this be 20° C., that during the calibration period the central unit records the exact average closed/open proportion of each radiator valve, on the basis of which correction coefficients are calculated for the relative heat consumption figures of the different rooms. These correction coefficients remain in the memory of the central unit and they may be checked by another calibration if need arises.

In both above-mentioned calibrations, all rooms had the same temperature, whereby there was no heat transfer through the walls of the rooms. In actual practice, the temperature differences between flats give rise to transfer of thermal energy through the walls from/into the neighbouring flats. It could be imagined as an extreme instance that in a given flat the temperature were kept so low that it would be totally heated by heating energy belonging to the neighbouring flats, whereby consequently the need of heating energy in the neighbouring flats would increase. If it is required that this, too, is accounted for, the system of the invention affords a calibration procedure for determination of the heat leakage between flats in that in certain selected flats the thermostats are given a lower setting (for instance, their lowest possible setting) than in the other flats (where the thermostats are fixed e.g. at 20° C., that the central unit records the temperature of the flat that has cooled down and the increase of heat consumption that has taken place in the neighbouring flats, and that on the basis hereof one calculates the magnitude of thermal leakage occurring between different flats, which is also a function of the differential temperature between the flats. It is possible from the calibration data thus obtained, to calculate the thermal leakage between flats as a function of the temperature difference between them, storing the equivalent data and the thermal leakage equation in the memory of the central unit.

In the following, an embodiment example of the system of the invention shall furthermore be described in detail, with reference being made to the attached drawings, wherein:

FIG. 1 presents the structural scheme of a system of the invention.

Figure 2:
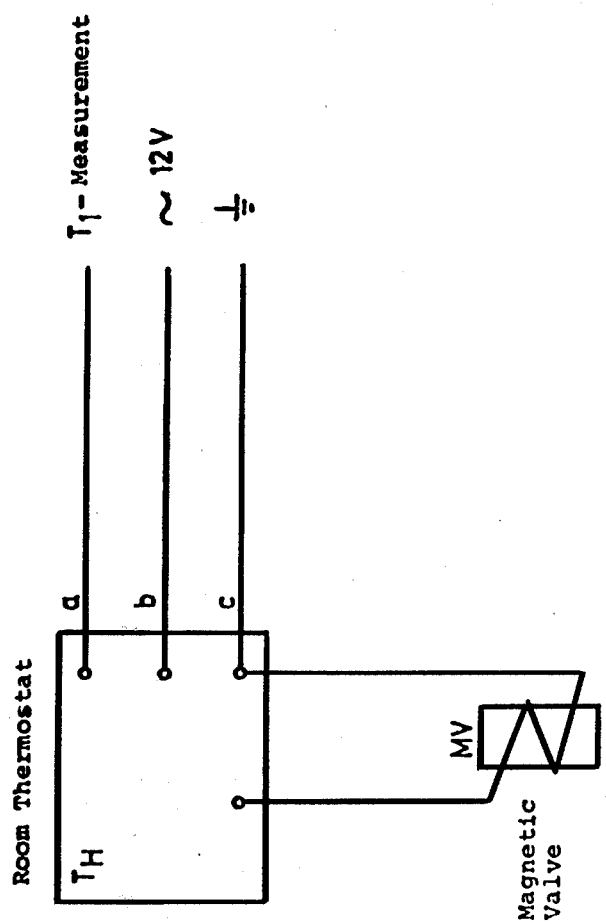

FIG. 2 presents the circuit connection of thermostat and magnetic valve.

Figure 3:
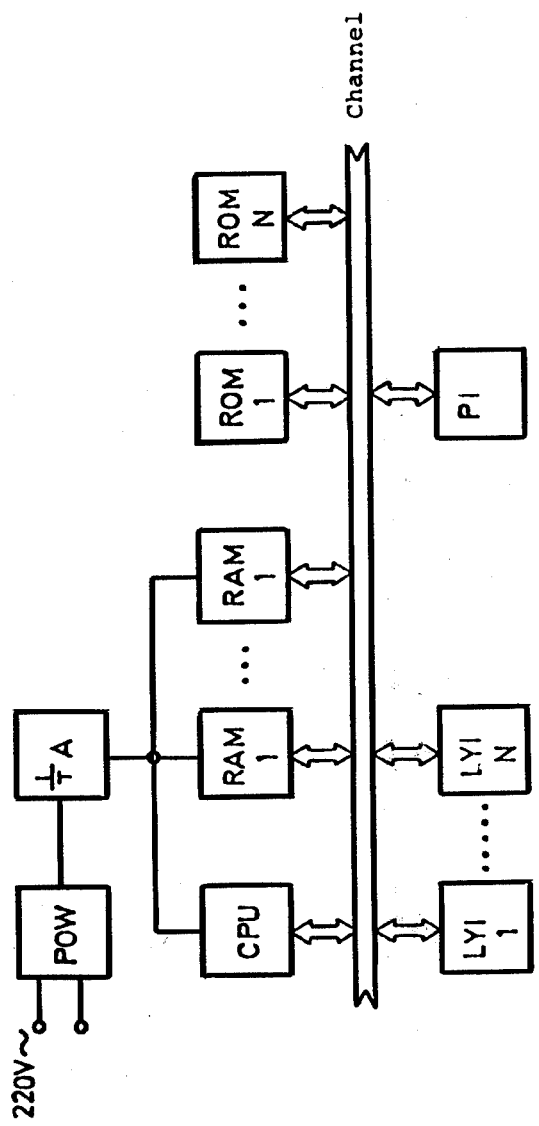

FIG. 3 presents a rough block diagram of the central unit.

FIG. 4 presents, by way of an example, the standard output from the central unit serving the charging (invoicing) for one period, and FIG. 5 presents, by way of an example, a fault output provided by the central unit.

The system which is illustrated by the drawings accomplishes the following tasks of measurement and control:

room-individual temperature control by means of an electronic room thermostat $T_H$ and electrically loaded heating radiator valves MV automatic measurement of the flat-individual relative distribution of the thermal energy supplied by the central heating system measurement of the consumption of warm and cold water, individually per flat semiautomatic switching, individual to each room or flat, between "present" and "absent" temperature automatic control of the heating centre and optimum control of the outgoing water temperature.

The heating energy of a flat is composed of the following factors:

(1) the heat energy given off by the heating radiators
(2) the thermal energy transferring through walls from-/into neighbouring flats
(3) the thermal energy given off by persons staying in the flat
(4) heat generated by electrically operated household appliances (refrigerators and deep freezes, lighting, etc.)
(5) radiant heat from the sun.

If one is able to measure reliably the thermal energies under (1) and (2), nothing else need be taken into account in the charging for heating services, because:

the heat generated by persons staying in the flat, by household appliances and lighting (and which is already "paid for") reduces in equivalent amount the need of central heating energy because the thermostats individual to each room maintain a constant temperature, the average influx of solar energy is automatically accounted for in the calibrating situation if this is desired. Another, possibly more equitable possibility would be to disregard the solar energy in the calibrating situation and, instead, take it into account in grading the purchase price of the flats and/or the basic compensation payable to the housing corporation.

In order to achieve additional savings, one may apply the present/absent heating system, which implies that while the flat is unoccupied in the daytime for instance, its temperature is automatically lowered. This feature can be added to the system with relatively minor extra cost by providing a present/absent switch, which saves remarkable amounts of heating energy, for instance in the form of a push-buttton incorporated in the room thermostat whereby this switch in its "absent" position controls the temperature in the flat in question to have a lower value, which is independent of the setting of the thermostats. This absence control may be accomplished, for instance, with the aid of a week-cycle clock, or the absence periods may be stored in the memory of the central unit and the equivalent control loading may be repeated with a weekly period, without any additional commands, so that at termination of the period of absence the set value temperature will have been reached by switching the thermostatic control on before the end of the absence period already.

Warm water is also an important form in which thermal energy is consumed. Several references agree in the estimate that warm water supplied to the households represents a remarkable cost item, even up to several ten percent of the total thermal energy expenditure. Therefore, when a housing unit changes over to the system of charging for thermal energy, it is sensible to include in the system the warm water, and at the same time cold water as well. It is for this reason that in the schematic diagram of FIG. 1 the warm and cold water metering, LVM and KVM respectively, and the warm water temperature measurement $T_V$ have been presented as parts associated with the total system, although nothing is connected with them which would be new and inventive.

The basic structure of the system is as follows. Each room is provided with an electronic thermostat $T_H$, which by a two-lead connection controls the magnetic valves MV of the heating radiators R. Several such may be connected in parallel to be controlled by one thermostat without any intermediate relay.

The thermostat $T_H$ and the magnetic valves MV are of the on/off design and the magnetic valve is open in its position at rest. The flow through the heating radiator R is controlled by changing the proportion of the open/closed times of the valve MV.

The water return connection of the radiators comprises the conventional throttling valves KV, which are used in the manner known in the prior art, for the basic commissioning adjustment of the system. The thermostat $T_H$ is supplied with an operating voltage from the connecting unit LY, and the connections are illustrated by FIG. 2. The thermostat controls the temperature in the room independently on its own. The open/closed times of the magnetic valves are monitored in the connecting unit LY, by measuring the current drawn by each thermostat $T_H$ in the leads b-c, and the temperature in the room is measured by means of the leads a-c.

The connecting unit comprises the following components and operations:
(1) Electric supply to the thermostats $T_H$
(2) Transmission of the open/closed proportions of the thermostats $T_H$ and of the room temperatures to the central unit KY
(3) Transmission to the central unit KY, of the outgoing water, return water, warm water and outdoors temperatures obtained from the temperature pick-ups $T_M$, $T_P$, $T_V$ and $T_U$
(4) Transmission of the loading signal of the three-way valve M
(5) Transmission to the central unit KY, of the consumption data supplied by the water meters LVM and KVM.

The connecting unit LY is galvanically isolated with regard to the thermostats $T_H$ as well as the central unit KY.

The central unit KY is a computer of the microprocessor type, to which a given number of associated units may be connected. The central unit comprises a report printer and the following external connections: an alarm means H located in the caretaker's flat
connection to the alarm centre HK of the building
connection to an external printer IO.

The partial functions of the central unit are:
(1) The KY unit monitors with the aid of each thermostat, individually regarding each room:
the room temperature, and
the open/closed proportion of the radiator valve.
From these quantities the KY unit computes the flat-individual total thermal energy consumption, using as weighting coefficients, the outgoing and return water temperatures.
(2) The KY unit monitors each flat's warm and cold water consumption and appends the consumption data to the charging print-out (FIG. 4).
(3) The KY operates the control of the three-way valve M in such manner that the outgoing water is at its optimum temperature, according to the following criteria, for instance:
the open/closed + closed time ratio S of the magnetic valves in the entire building is the same on the average, for instance 0.7, and
not more than one room at the most presents the ratio $S=1$ while at the same time the temperature in it has gone down below a predetermined limit, say 19° C. The upper limit temperature of the outgoing water is obtained from the tabular data stored in the central unit, with the aid the outdoor thermometer $T_U$. This serves to prevent excessive heating of the outgoing water in the event of any fault and in the case that the above control criteria are transgressed, for instance, owing to the simultaneous ventilating of several rooms.
(4) The central unit actuates a fault alarm with the following criteria, for instance:
The top limit of the outgoing water temperature has been reached
The temperature of the outgoing water does not level out at a value such that the radiators have on the average $0.4 < 1\, S < 0.8$
The temperature in any one room is permanently (e.g. during 24 hrs) higher than 22° C. and there is $S < 0.4$. The fault is an incorrect setting of the thermostat, or defect of the thermostat, radiator valve or connecting unit.
The radiator in any one room has S permanently (e.g. longer than 6 hrs) higher than 0.95. The fault is then a powerful leakage of heat from the room, such as an open or broken window, or a damaged thermostat or valve.
The temperature of the warm water falls below allowed limit, for instance 55° C.

CALIBRATION OF THE SYSTEM

The housing corporation may decide, on "equity considerations" for instance, to furnish to all residents, against the same relative basic cost, the same basic temperature in all rooms. The variable factors are then:
the location of the room (against an end wall, top floor, facing south/north, etc.)
the thermal insulation of the room (quality variations of the thermal lagging, large/small windows, etc.)
potential heat leakage from the outgoing/return water pipes, from ventilation ducts, etc.

Therefore, the purpose of the calibration is to clarify and to store in the memory of the central unit the correction coefficients which are implied by these variable factors.

A rough calibration is first carried out, in exact conformity with the general practice in existing heating systems. This is done in that, at the planning of the heating system for the particular building, there has been calculated from the basic data of the pipe system, the base setting of the throttling valve KV of each radiator. At the commissioning of the heating system, the throttling valves are adjusted to the calculated value, the thermostats are set at their maximum setting and the temperature of the outgoing water is so adjusted that an average temperature of 20° C. is obtained in the different rooms of the building. Any individual deviations of the different rooms are eliminated by amending the calculated setting of the throttling valves KV.

After this calibration has been made, all radiator valves should, in principle, have the same open/closed proportion. Since however the position of the throttling valves KV cannot be set with any very high accuracy, an adjustment calibration is carried out in that all thermostats are fixed e.g. at the 20° C. setting and the residents are informed that
ventilation is prohibited
the use of household machines which continuously generate heat should be avoided.

The calibration may be performed at a time which is representative as regards the heating of the building, and it takes the time of 1–2 days, for instance. During this period the central unit records, for instance during the night hours, the exact average closed/open ratio of the radiator valves MV in each room and it computes the final correction coefficients for the relative heat consumptions of the different rooms. These correction coefficient are stored in the memory of the central unit and they are used in calculating the final heat balances.

In both above-described calibrations all rooms had the same temperature and therefore there was no heat transfer through the walls of the rooms. If it is desired to take this also into account, the leakage of heat between flats is determined in the following manner:

in certain selected flats, the thermostats are adjusted to their lowest setting, the thermostats in the rest of the flats being fixed at 20° C.

the central unit records the ultimate temperature of the flat that has cooled down and it records the increase of heat consumptiion in the adjacent flats the amount of heat leakage occurring between different flats is calculated from these data by multivariate analysis. This heat leakage may be assumed to be a linear function of the differential temperature between flats, although even the determining of a more complicated relationship and the programming of the corresponding calculation formula into the central unit meets no difficulties.

After the system has been calibrated in this manner, the central unit is capable of computing the following quantities:

(1) By comparing the closed/open ratios of the radiator valves in different rooms, the central unit is able to read in the relative distribution of the thermal energy consumption in the different rooms/flats and in the entire building.

(2) By comparing the temperatures in different rooms, the KY unit is able to compute the heat flows between flats, utilizing the data in its memory concerning the heat flow resistances between rooms.

(3) From the results computed under (1) and (2), the central unit may compute the true relative thermal energy share used by each flat comprising both the central heating energy supplied and the heating energy received from neighbours.

The cold and warm water metering systems require no calibration because theirs is an absolute indication.

The compensation for heating is fixed as a basic compensation payable in the amount of X Fmk per m². If all flats had the same temperature and if the ventilation conditions were the same in them, all flats would also have a compensation for heating equalling this basic compensation.

When the residents' individual consumer habits vary, they are automatically recorded in the memory storage of the central unit in the form of coefficients $Y_I$, such a coefficient representing the relative share of the whole buildind's heating energy which flat n:o I had consumed during the charging or invoicing period. In other words, $Y_I$ has the following significance: "This flat has during the past charging period consumed heating energy, per floor square meter $Y_I$ times the amount implied by the measured specific consumption of the same flat. Therefore the heating compensation which this flat is due to pay is $Y_I$ times x Fmk per m²".

The warm water and cold water compensation payments follow directly from the water quantities and from the temperature of the warm water.

THE CENTRAL UNIT

The central unit of the system may be carried out, for instance, as a modular micro-computer as shown in the attached FIG. 3. To this it is possible to connect, for instance, between 1 and 16 connecting units LY. The fundamental part of the central unit consists, in this exemplary case, of a processor (CPU), read-in/printout memories (RAM), read-in memories (RAM), panel interface (PI), power supply (POW), stand-by storage batteries (A) and input unit interfaces (LYI). The CPU is carried out, for instance by means of a universal microprocessor, and it comprises, in addition to the microprocessor, the governor logics, real time clock and channel buffering required for the timing of the system.

The RAM may be carried out as a semiconductor memory store, either with CMOS or static NMOS circuits, and the storage capacity of one module is optimated so that extension of the system is flexibly feasible.

The ROM may be carried out by using EPROM semiconductor memory circuits, which are easy to programme and, if necessary, to reset for reprogramming. It is expedient to subdivide the programmes for the micro-computer and the fixed data so that the basic programme and basic data are located in one module and the changing data are brought in from different modules.

It is possible by the LYI to connect one connecting unit to the central unit. The LYI comprises the requisite output and input connections for the step unit, galvanic isolators, and the input logics to the channel of the microcomputer.

Through the PI, a report printer as well as alarm and status information controls are connected to the system.

Power supply to the system is by normal mains voltage, and the power supply for the CPU and for the RAM modules is backed up with storage batteries, so that in the event of mains failure the status information in the system can be retained and operations may continue after the mains voltage has been restored.

OUTPUT PRINTING

The central unit can be fitted with an automatic output printer. FIG. 4 displays an example of a possible output format in the weekly and monthly outputs. This shows the average temperatures in the different rooms of the flat (n:o 31, for instance), the above described coefficient, $Y_I = 1.25$, by which the fixed heating compensation x Fmk per m² has to be multiplied in order to find the amount to be charged to this particular flat for heating. It shows furthermore, the relative heat quantities which have gone over to the adjacent flats (n:o 30 and 41) and the relative heat quantities receive from adjacent flats (n:o 32 and 21), all of which together with their own relative heating energy consumption determine the total coefficient 1.25.

FIG. 5 displays the output format in cases of fault, in this instant a window in room n:o 2 having been kept open for a prolonged time, while in room n:o 3 an exceptionally high temperature had been set. The asterisks indicate that fault alarm has gone out.

As was already observed, the measuring and control system described above in relation to a heating system may in equivalent manner be applied in cooling systems as well, and the protective scope of the claims following below shall therefore analogously cover also the application of the present invention in cooling systems.

We claim:

1. System for control and measurement of flat-individual heating/cooling, to the purpose of charging each flat individually for heating/cooling energy, said system comprising, as components previously known in themselves, room thermostats ($T_H$), which govern the valves (MV) of the heating radiators (R) or cooling evaporators, the thermostats and valves being of an on/off design, further, temperature measuring pick-ups ($T_M$, $T_p$) for the temperatures of the heating/cooling fluid on the outgoing and return side, and a connecting unit (LY) for transmitting the measurement data to a central unit (KY), which performs the processing of the data and the output, characterized in that the relative consumption of heating or cooling energy by the flats is measured by monitoring the proportion of the closed/open times of the valves (MV) of the heating radiators or cooling evaporators and by employing the temperatures of the heating or cooling fluid on the outgoing and return sides as weighting factors.

2. System according to claim 1, characterized in that the temperature of the heating fluid on the outgoing side, such as the outgoing water, or the quantity of the cooling fluid on the outgoing side has been arranged to be so controlled that the open/closed=open-time ratio of the valves in the whole building is on the average equal to a predetermined constant, preferably between 0.5 and 0.8.

3. System according to claim 2, characterized in that the central unit (KY) has been arranged to carry out fault monitoring in the system by monitoring the said time proportion and/or comparing it individually in the case of different rooms with the temperature in the same room, the central unit actuating a fault alarm if the same quantities deviate from certain predetermined limiting values or if their mutual ratio changes.

4. System according to any one of the preceding claims, characterized in that on the basis of the outdoor temperature ($T_U$) only the upper limit is fixed for the temperature of the heating fluid on the outgoing side or for the quantity of the cooling fluid on the outgoing side.

5. System according to claim 1, characterized in that the thermostat ($T_H$) operates as a series-connected switch between the connecting unit (LY) and the valves (MV) in such manner that at the beginning of control periods repeated with fixed intervals the valves (MV) receive no actuating signal and that after a time which is proportional to the differential between the room temperature and the temperature set on the thermostat ($T_H$) the thermostat connects the actuating signal through the valves, the closed/open times of the valves being monitored in the connecting unit (LY) by measuring the actuating power drawn by each thermostat ($T_H$).

6. System according to claim 1, characterized in that it comprises a present/absent switch, for instance in the form of a push button incorporated in the room thermostat, this switch causing, in its "absent" position, the temperature in the flat to be controlled to a lower temperature independent of the setting of the thermostats ($T_H$).

7. System according to claim 6, characterized in that the "absent" loading has been implemented either by means of a week clock or by storing the periods of absence in the memory of the central unit, so that an "absent" loading consistent therewith is effected without any additional commands with a given periodicity, for instance with a one-week cycle.

8. System according to claims 6 or 7, characterized in that the thermostat control has been arranged to be switched on prior to termination of the period of absence, whereby at the end of the period of absence the set-point temperature has been substantially attained.

9. Procedure for calibrating a system according to claims 1 or 5 so that regardless of variable factors, such as different locations of the rooms, thermal insulation and heat leakages by ventilation ducts, the residents of the building are guaranteed, against the same relative basic cost, the same basic temperature in all rooms, there being in said procedure calculated at the stage when the heating system is being planned, for each heating radiator's throttling valve (KV) a basic setting on the basis of the fundamental data of the pipelines, and the throttling valves (KV) being set according to the calculated values in connection with the commissioning of the heating system, and the thermostats ($T_H$) being set to their position corresponding to maximum temperature and the temperature ($T_M$) of the outgoing water being so regulated that in all rooms a given average temperature is obtained, for instance 20° C., the room-individual temperature deviations being then eliminated by amending the calculated positions of the throttling valves (KV), characterized in that thereafter all thermostats ($T_H$) are fixed in a given position, e.g. set at 20° C., that during the calibration period the central unit (KY) records the exact average closed/open proportion of each radiator valve (MV), on the basis of which correction coefficients are computed for the relative heat consumptions of the different rooms.

10. Procedure according to claim 9 for calibrating the system in order to take into account the leakage of heat between flats, characterized in that in certain selected flats the thermostats ($T_H$) are set lower (for instance at their lowest setting) than in the other flats (where the thermostats are fixed e.g. at 20° C.), that the central unit (KY) records the temperature in the cooled flat and the increase of heat consumption that has taken place in adjacent flats and that on the basis hereof the magnitude of heat leakage between the different flats is calculated.

* * * * *

UNITED STATES PATENT AND TRADEMARK OFFICE
CERTIFICATE OF CORRECTION

PATENT NO. : 4,221,260
DATED : September 9, 1980
INVENTOR(S) : Matti N.T. Otala and Lauri Kuokkanen It is certified that error appears in the above-identified patent and that said Letters Patent are hereby corrected as shown below:

Column 9, line 13, after open/closed, " = " should be -- + --;

lines 22 and 23, "same quantities" should read -- said quantities --.

Signed and Sealed this

Ninth Day of June 1981

[SEAL]

Attest:

RENE D. TEGTMEYER

Attesting Officer

Acting Commissioner of Patents and Trademarks

UNITED STATES PATENT AND TRADEMARK OFFICE
CERTIFICATE OF CORRECTION

PATENT NO. : 4,221,260
DATED : September 9, 1980
INVENTOR(S) : Otala et al

It is certified that error appears in the above-identified patent and that said Letters Patent are hereby corrected as shown below:

In the drawings, Sheet 1, FIGURE 1, both valves KV should be shown connected to the "Return water" line as follows:

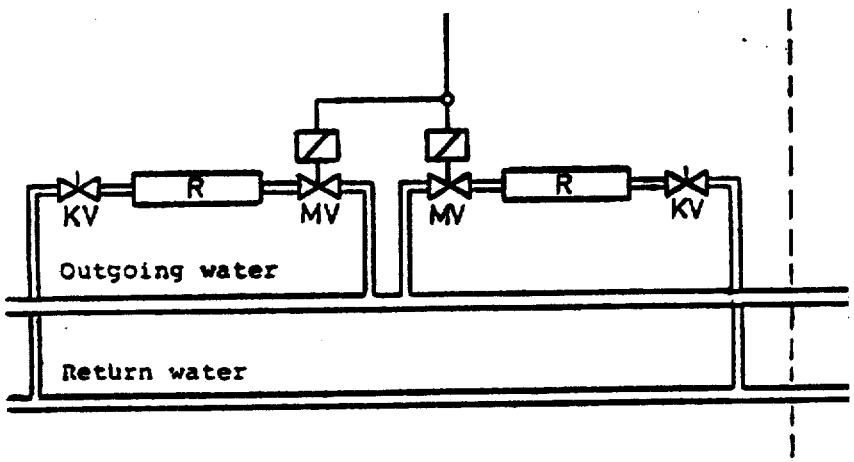

UNITED STATES PATENT AND TRADEMARK OFFICE
CERTIFICATE OF CORRECTION

PATENT NO. : 4,221,260  
DATED : September 9, 1980  
INVENTOR(S) : Otala et al

Page 2 of 2

It is certified that error appears in the above-identified patent and that said Letters Patent are hereby corrected as shown below:

In the drawing figure on the title page, both valves KV should be shown connected to the "Return water" line as follows:

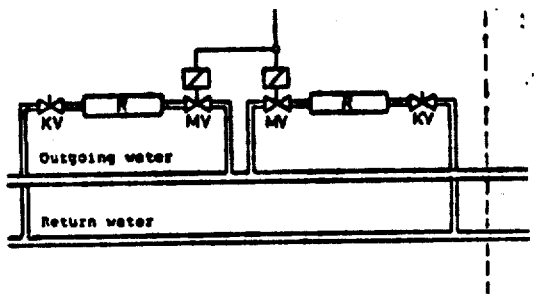

Signed and Sealed this

Eighth Day of February 1983

[SEAL]

Attest:

Attesting Officer

GERALD J. MOSSINGHOFF

Commissioner of Patents and Trademarks